US005441222A

United States Patent [19]

Rosen

[11] Patent Number: 5,441,222

[45] Date of Patent: Aug. 15, 1995

[54] ATTITUDE CONTROL OF SPINNING SPACECRAFT

[75] Inventor: Harold A. Rosen, Santa Monica, Calif.

[73] Assignee: Hughes Aircraft Company, Los Angeles, Calif.

[21] Appl. No.: 52,879

[22] Filed: Apr. 26, 1993

[51] Int. Cl.[6] .......................... B64G 1/28; G05D 1/02

[52] U.S. Cl. .................................... 244/165; 244/176; 244/195

[58] Field of Search ............... 244/164, 165, 166, 170, 244/171, 176, 194, 195

[56] References Cited

U.S. PATENT DOCUMENTS

| | | | |
|---|---|---|---|
| 3,003,356 | 10/1961 | Nordsieck | 244/165 |
| 3,813,067 | 5/1974 | Mork | 244/165 |
| 3,999,729 | 12/1976 | Muhlfelder et al. | 244/165 |
| 4,136,844 | 1/1979 | Maudal | 244/165 |
| 4,325,586 | 4/1982 | Hubert | 244/171 |
| 4,723,735 | 2/1988 | Eisenhaure et al. | 244/165 |
| 5,047,945 | 9/1991 | Palusek | 244/166 |
| 5,058,835 | 10/1991 | Goodzeit | 244/165 |
| 5,098,041 | 3/1992 | Uetrecht | 244/171 |
| 5,261,631 | 11/1993 | Bender et al. | 244/165 |
| 5,269,483 | 12/1993 | Flament | 244/169 |

FOREIGN PATENT DOCUMENTS

| | | | |
|---|---|---|---|
| 0453096 | 10/1991 | European Pat. Off. | 244/165 |
| 496184 | 7/1992 | European Pat. Off. | 244/165 |
| 4321494 | 11/1992 | Japan | 244/165 |

*Primary Examiner*—Andres Kashnikow
*Assistant Examiner*—Virna Lissi Mojica
*Attorney, Agent, or Firm*—Terje Gudmestad; W. K. Denson-Low

[57] ABSTRACT

The attitude of a spinning spacecraft (20) whose spin axis is substantially in the plane of the orbit is controlled without the use of reaction control thrusters. A two-axis gimbal (24) on which a momentun wheel (26) is mounted is secured to a central body (21). Two actuators (40, 42) are used to selectively pivot the gimballed momentum wheel (26) about each gimbal axis (x, y) in order to apply a control moment to change the attitude state of the spacecraft (20).

27 Claims, 2 Drawing Sheets

58
40
ACTUATOR (x-AXIS)
$L_x$
$L_y$
ACTUATOR (y-AXIS)
42
60
54
70
56
72
$KI_x\ (n\cos\omega_z t - \omega_x)$
$-(I_x - I_y + I_z)\ n\omega_z \sin\omega_z t$
$-(I_y - I_x + I_z)\ n\omega_z \cos\omega_z t$
$KI_y\ (-n\sin\omega_z t - \omega_y)$
52
SPACECRAFT CONTROL PROCESSOR
DESIRED $\theta_y$
n
DESIRED $\theta_x$
64
COMMAND RECEIVER
68
$\theta_x$
$\omega_x$
n
$\omega_y$
$\theta_y$
$\omega_z$
66
66
62
GYRO PACKAGE
63
61
SPACECRAFT DYNAMICS
50

ATTITUDE CONTROL OF SPINNING SPACECRAFT

BACKGROUND OF THE INVENTION

1. Field of the Invention

This invention broadly relates to positioning of spacecraft and more particularly to attitude control.

2. Description of the Prior Art

Attitude control of spin stabilized spacecraft has traditionally been accomplished by pulsed thrusters which provide spin phased moments. This works well when the operational spin axis is normal to the orbit plane. The payloads in some spacecraft, however, require a nadir pointing spin axis. In order to preclude continuous thrusting to maintain the orbital angular rate, momentum cancelling wheels hard mounted to the spacecraft are used to create a zero momentum system. When it is desired to slew the spin axis from one pointing direction to another, reaction control thrusters are used to create the starting and stopping moments. If solar radiation pressure creates undesired external moments, thrusters are also used to cancel such moments.

While reaction control thrusters are necessary, it would be desirable to use them as little as possible. There is a limited amount of propellant available to fire the thrusters. The more that the thrusters must be fired, the less fuel available for later maneuvers. Further, there are inherent uncertainties involving a thruster on-time and sophisticated methods are required in order to compensate for these uncertainties.

SUMMARY OF THE INVENTION

The present invention relates to an apparatus and method for attitude control of a spinning spacecraft whose spin axis is substantially in the plane of the orbit without the use of reaction control thrusters.

The attitude control system of the present invention includes a two-axis gimbal mounted to the central body of a spacecraft. The spacecraft has a center of momentum, CM, which acts as the origin for principal body axes x, y, and z, each of which is at a right angle to the other two. The spacecraft spins about the z-axis. The gimbal has a first portion pivoting about the x-axis and a second portion pivoting about the y-axis. A momentum wheel is secured to the gimbal. The control system includes at least two actuators, a first actuator disposed between the outer surface of the spacecraft and the first portion to apply a first control moment about the x-axis. A second actuator is disposed between the outer surface and the second portion to apply a second control moment about the y-axis. Together, these control moments are used to control the attitude of the satellite.

In a preferred embodiment, the actuators are electromagnetic force generators.

A satellite provided with such an attitude control system has a gyroscope to sense the attitude state of the spacecraft. A control processor receives this information and computes a control moment signal. This control moment signal is applied to the actuators to generate a force within them. This force causes the gimballed momentum wheel to react against the central body of the spacecraft and results in a selected control moment being applied about the x-axis and the y-axis to change the attitude state of the spacecraft.

In a preferred embodiment a feedforward input signal and a feedback input signal are both computed in order to damp the excited nutation which results from the starts and stops of maneuvers.

While the spacecraft has a spin axis substantially within the plane of the orbit, the attitude state may be changed using the present invention so that the satellite may center on any point of the planet which it circles. Thus, in a preferred spacecraft according to the present invention, a radio command system receiver may be used to receive commands to change the attitude state, the commands being sent to the processor for computation.

BRIEF DESCRIPTION OF THE DRAWINGS

The various features, objects, benefits, and advantages of the present invention will become more apparent upon reading the following detailed description of the preferred embodiments, along with the appended claims in conjunction with the accompanying drawings, wherein identical reference numerals identify like features, and:

DETAILED DESCRIPTION OF A PREFERRED EMBODIMENT

Figure 1:
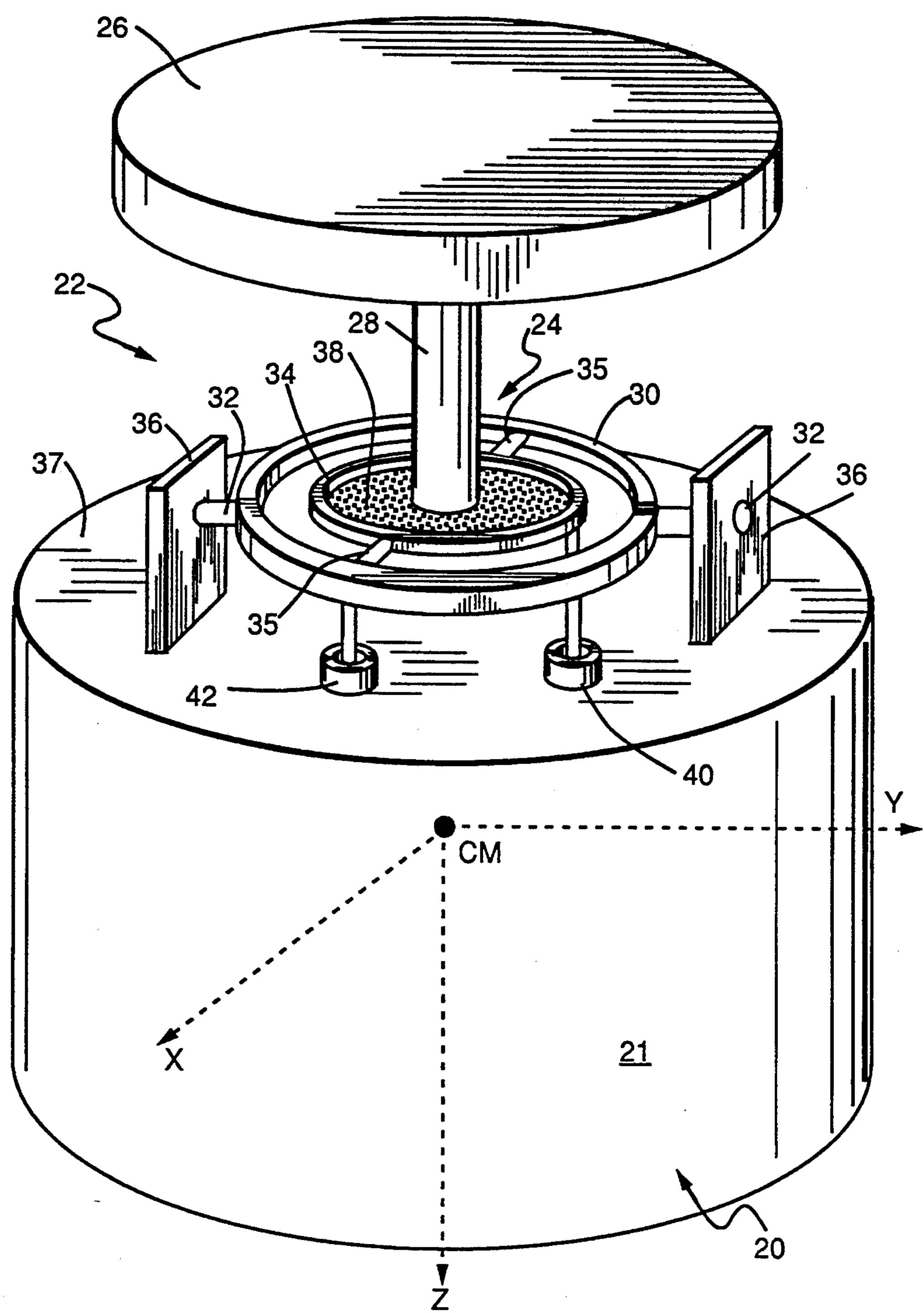
FIG. 1 is a perspective view of a spacecraft incorporating the present invention.

The use of thrusters for attitude control of a spacecraft 20 having a central body 21 can be precluded by use of an attitude control system 22 illustrated in FIG. 1. Spacecraft 20 is intended to have a spin axis substantially within the plane of the orbit, whose attitude may be controlled without the use of reaction control thrusters. However, the spacecraft 20, which is generally used in applications requiring selective centering on any point of the planet which it circles, must be able to have a spin axis which is not completely within the plane of the orbit. For example, in order to center on a point between the equator and a pole of the earth, a spacecraft in geosynchronous orbit about the earth must be able to rotate through an angle of approximately 8.7 degrees.

Spacecraft 20 has a center of momentum, CM, which acts as the origin for principal body axes x, y, and z, each of which is at a right angle to the other two. System 22 comprises a two-axis gimbal 24 on which a momentum wheel 26 is mounted via a shaft 28. Shaft 28 extends outwardly from central body 21. Gimbal 24 includes an outer annular ring portion 30 secured about a pivot 32 extending along the y-axis and an inner annular ring portion 34 secured about a pivot 35 extending along the x-axis. Gimbal 24 is mounted to central body 21 via supports 36, which secure pivot 32 to an outer surface 37 of the spacecraft. Pivot 35 is secured between outer portion 30 and inner portion 34. Shaft 28 extends outwardly from a central portion 38 of inner portion 34. Control moments which affect the attitude of spacecraft 20 are selectively applied by actuators 40 and 42, respectively. Actuator 40 is secured to outer surface 37 and positioned to apply a selected control moment about the x-axis via its contact with inner ring 34 while actuator 42 is secured to outer surface 37 and positioned to apply a moment about the y-axis via its contact with outer ring 30. It is preferred that actuator 40 be located along the y-axis and actuator 42 located along the x-axis to balance the application of the applied control moments and avoid the undesirable application of unwanted secondary moments. Actuators 40 and 42 may be composed of any number of devices including electromagnetic force generators such as the voice coils of loudspeakers. In operation, a selected force developed by actuator 40 exerted on central body 21, causing it to react against momentum wheel 26, creates a moment $L_x$ about the x-axis of spacecraft 20. Similarly, a force developed by actuator 42 exerted on central body 21 creates a moment $L_y$ about the y-axis of the spacecraft.

The moments of inertia about the principal axes x, y, and z of spacecraft 20 are $I_x$, $I_y$, and $I_z$ respectively. Spacecraft 20 spins about its z-axis with an angular rate $\omega_z$ radians per second. If the spacecraft is to orbit a planet at a fixed angular orbital rate of n radians per second with no wobble, the transverse angular velocity $\omega_T$ of the spacecraft must be a constant n radians per second in inertial coordinates. In body coordinates, the transverse angular velocity counterspins at $\omega_z$, so that it may be expressed as:

$$\omega_T=\omega_x+j\omega_y=n\ e^{-j\omega_z t}. \quad (1)$$

$\omega_x$ is the angular rate about the x-axis and $\omega_y$ is the angular rate about the y-axis. t represents time. $\omega_x$ and $\omega_y$ are computed using the following equations:

$$\omega_x=n\cos\omega_z t, \quad (2)$$

$$\omega_y=-n\sin\omega_z t. \quad (3)$$

The derivatives of $\omega_x$ and $\omega_y$ are calculated as follows:

$$\omega_x=-n\omega_z\sin\omega_z t, \quad (4)$$

$$\omega_y=-n\omega_z\cos\omega_z t. \quad (5)$$

The so-called Euler's Equations, used for calculating the motion of a rigid body such as .spacecraft 20, are represented by the following expressions:

$$L_x=I_x\omega_x+(I_z-I_y)\omega_z\omega_y \quad (6)$$

and $$L_y=-(I_z-I_x)\omega_z\omega_x+I_y\omega_y, \quad (7)$$

where $L_x$ and $L_y$ are the moments defined above. Substituting from equations (2) through (5) into equations (6) and (7) yields the following equations:

$$L_x=-(I_x-I_y+I_z)n\omega_z\sin\omega_z t, \quad (8)$$

$$L_y=-(I_y-I_x+I_z)n\omega_z\cos\omega_z t. \quad (9)$$

The expressions derived for $L_x$ and $L_y$ in equations (8) and (9) are used to determine the vector moment of spacecraft 20:

$$L_x+jL_y=n\omega_z[I_z e^{-j(\omega_z t+\pi/2)}+(I_x-I_y)e^{j(\omega_z t+\pi/2)}]. \quad (10)$$

Equation (10) has two terms, the first of which counterspins and the second of which forward spins. The first term is thus fixed in inertial space, and precesses the body at the orbital rate. The second term forward rotates in inertial space at twice $\omega_z$ and keeps the precession steady in the presence of asymmetry. This equation shows that in order to have a wobble free system, two components of torque must be applied. System 22 is designed to provide these two components as required via the positioning and use of actuators 40 and 42 in conjunction with the two-axis gimbal 24 on which momentum wheel 26 is mounted.

The magnitude of the second term in equation (10) is proportional to the difference in transverse inertias. If this term is omitted, moments $L_x$ and $L_y$ are altered as shown in the following equations:

$$L_x=-n\omega_z I_z\sin\omega_z t \quad (11)$$

and $$L_y=-n\omega_z I_z\cos\omega_z t. \quad (12)$$

Substituting the expressions of equations (11) and (12) into Euler's equations (6) and (7) yields the following expressions:

$$\omega_x=\frac{I_z-2I_y}{I_z-(I_x+I_y)}\,n\cos\omega_z t \quad (13)$$

and $$\omega_y=\frac{2I_x-I_z}{I_z-(I_x+I_y)}\,n\sin\omega_z t. \quad (14)$$

Substituting equations (13) and (14) into equation (1) yields the following transverse angular velocity expression:

$$\omega_T=\omega_x+j\omega_y=n\,e^{-j\omega_x t}+\frac{I_x-I_y}{I_z-(I_x+I_y)}\,n\,e^{j\omega_z t}. \quad (15)$$

The first term in equation (15) is consistent with the desired steady orbital rate precession, while the second term, which represents a forward rotation at twice the spin rate in inertial coordinates, is an undesired wobble. It occurs in a system having a prior art hard mounted momentum cancelling wheel. This wobble does not occur when using system 22.

In slewing from one pointing direction to another, a precession rate considerably greater than orbital rate may be desired. The corresponding control moments can be obtained from the vector moment expression expressed in equation (10) by substituting the desired slew angular rate for the orbital angular rate n, and adjusting the spin phase angle of moments $L_x$ and $L_y$ to correspond to the desired slew pointing directions $\theta_x$ and $\theta_y$.

Figure 2:
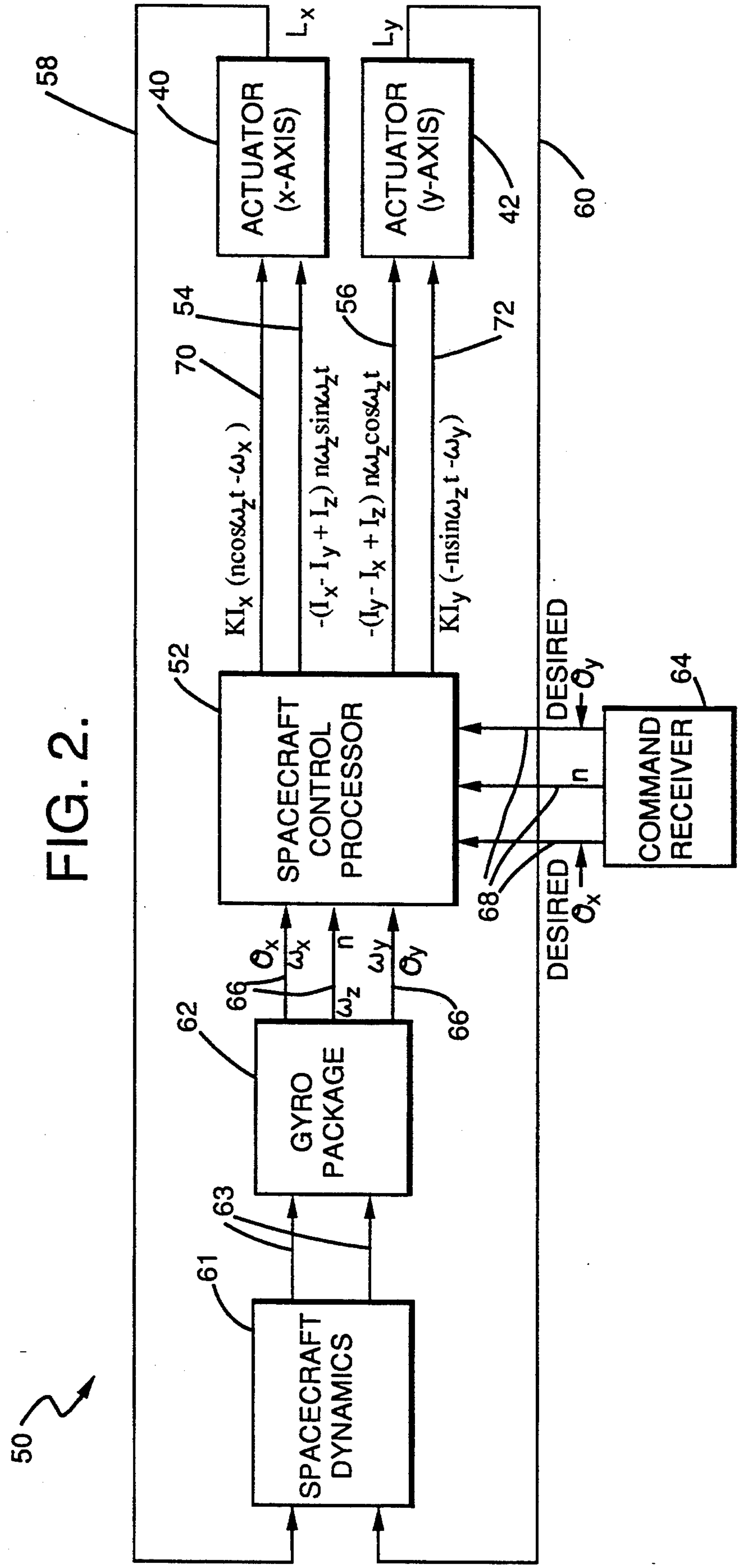
FIG. 2 is a block diagram illustrating features of the present invention.

As shown in the block diagram 50 of control system 22 in FIG. 2, the spacecraft control processor 52 computes control moments $L_x$ and $L_y$. Feed-forward input signals 54 and 56 represented by equations (8) and (9) are inputted to actuators 40 and 42, respectively. The actuators respond and outputs 58 and 60 result in a change in spacecraft dynamics 61. Actuators 40 and 42 apply the indicated moments $L_x$ and $L_y$ by generating a force resulting in the reaction of central body 21 against the gimballed momentum wheel 26 as discussed above. A rate gyroscope sensor package 62 senses the actual pointing directions and angular rates 63 of spacecraft 20, which are then inputted into spacecraft control process 52. Simultaneously, a radio command system receiver 64 receives the desired pointing directions $\theta_x$ and $\theta_y$, and the desired angular rates. Spacecraft control processor 52 accepts the inputs 66 from gyroscope sensor package 62 and inputs 68 from receiver 64 and computes feed-forward input signals 54 and 56 and feedback input signals 66 and 68. Feedback input signals 70 and 72 are used to close the feedback loops for $L_x$ and $L_y$.

Feedback input signals to close the feedback loops for each selected control motion are present in a preferred embodiment because the starts and stops of maneuvers excite nutation which persist unless damped. Nutation damping via a transverse angle rate feedback is a convenient method of causing rapid decay of nutation. This feedback will also correct most calibration errors.

The response of the system to the feedback in terms of the inertia ratios $$\sigma_x = \frac{I_z}{I_x} \text{ and } \sigma_y = \frac{I_z}{I_y} \text{ is}$$

$$\omega_x = \frac{(S+K)Kn\cos\omega_z t + (\sigma_y - 1)\frac{I_y^2}{I_x}\omega_z Kn\sin\omega_z t}{(S+K)^2 + (\sigma_x - 1)(\sigma_y - 1)\omega_z^2} \quad (16)$$

and $$\omega_y = \frac{-(S+K)Kn\sin\omega_z t + (\sigma_x - 1)\frac{I_x^2}{I_y}\omega_z Kn\cos\omega_z t}{(S+K)^2 + (\sigma_x - 1)(\sigma_y - 1)\omega_z^2}. \quad (17)$$

S is the derivative with, respect to time, d/dt, and 1/K is the nutation damping time constant. With K in the denominator of equations (16) and (17) set to 0, there would be undamped oscillation.

Feedback input signals 70 and 72 are represented by the following equations:

$$L_x = KI_x(n\cos\omega_z t - \omega_x), \quad (18)$$

$$L_y = KI_y(n\sin\omega_z t - \omega_y). \quad (19)$$

In order to be able to compute these feedback input signals, gyroscope package 62 is essential. The feedback input signals represent the difference between the desired rate as shown in equations (2) and (3) respectively, and the actual angular rates measured by gyros 62. Thus, the unwanted components of angular rate are suppressed.

While a preferred embodiment of the present invention has been described so as to enable one skilled in the art to practice the method[of the present invention, it is to be understood that variations and modifications may be employed without departing from the purview and intent of the present invention, as defined in the following claims. Accordingly, the proceeding description is intended to be exemplary and should not be used to limit the scope of the invention. The scope of the invention should be determined only by reference to the following claims.

I claim:

1. An attitude control system for a spinning spacecraft comprising:

a gimbal adapted to be mounted on said spacecraft, said gimbal having first and second portions respectively pivotable about first and second orthogonal axes (x, y);

a spinning momentum wheel mounted on said gimbal;

first actuator means connected between said first portion and said spacecraft for applying a first control moment to said spacecraft about said first axis (x); and, second actuator means connected between said second portion and said spacecraft for applying a second control moment to said spacecraft about said second axis (y), said first and second actuator means being respectively secured to said first and second portions at locations along said first and second axes respectively to avoid the undesirable application to said spacecraft of unwanted secondary moments, said first and second control moments being operative to control the attitude of said spacecraft.

2. An attitude control system as recited in claim 1, wherein said first and second portions of said gimbal are independently pivotable respectively about said first and second axes (x, y), each of said first and second portions being pivotable about spaced apart pivots, said first and second actuator means being connected to said first and second portions intermediate the spaced apart portions thereof.

3. An attitude control system as recited in claim 2, wherein said momentum wheel is mounted on said first portion of said gimbal.

4. An attitude control system as recited in claim 3, wherein said second portion of said gimbal surrounds said first portion.

5. An attitude control system as recited in claim 2, wherein said first and second portions of said gimbal respectively includes a pair of concentric mounting rings, pivotally connected with each other.

6. An attitude control system as recited in claim 1, wherein said first actuator means and said second actuator means include electromagnetic force generators.

7. An attitude control system as recited in claim 1, including a support for mounting.

8. An attitude control system as recited in claim 1, including a shaft extending between said momentum wheel and a central portion of said first portion of said gimbal.

9. A spinning spacecraft whose spin axis is substantially in the plane of the orbit, comprising:

a central body;

a two-axis gimbal mounted to said central body, said gimbal having first and second portions respectively pivotable about first and second orthogonal axes (x, y);

a spinning momentum wheel mounted on said gimbal;

a first actuator connected between said first portion and said central body for applying a first control moment about said first axis (x); and a second actuator connected between said second portion and said central body for applying a second control moment about said second axis (y), said first and second actuators being respectively secured to said first and second portions at locations along said first and second axes respectively to avoid the undesirable application to said spacecraft of unwanted secondary moments, said first and second control moments controlling the attitude of said spacecraft.

10. A spacecraft as recited in claim 9, including a support mounting said gimbal on said central body at a pivot point.

11. A spacecraft as recited in claim 8, including a gyroscope for sensing said attitude of said spacecraft.

12. A spacecraft as recited in claim 11, including a control processor for receiving said attitude from said gyroscope and for computing a control moment signal to be applied to said first and second actuators.

13. A spacecraft as recited in claim 12, including a radio command system receiver for receiving a command to change said attitude, said con, and being applied to said processor.

14. A method for controlling the attitude state of a spinning spacecraft with a spinning momentum wheel, comprising the step of pivoting said wheel independently about first and second orthogonal axes (x, y) by applying a first control moment to said spacecraft about said first axis (x) and a second control moment to said spacecraft about said second axis (y) to change said attitude state of said spacecraft, said first and second control moments being applied to said spacecraft at locations along said first and second axes respectively at locations selected to avoid the undesirable application to said spacecraft of unwanted secondary moments.

15. A method as recited in claim 14, wherein:

said first control moment is applied to a first portion of a two-axis gimbal, said first portion pivoting about said first (x) of said axe,s; and said second control moment is applied to a second portion of said gimbal, said second portion pivoting about said second (y) of said axes.

16. A method as recited in claim 15, including the steps of:

sensing an attitude state of said spacecraft; and computing a control moment signal.

17. A method as recited in claim 16, including the steps of:

applying said control moment signal to first and second actuators;

generating a force in said actuators to react a central body of said spacecraft against said gimbal with said momentum wheel;

applying selectively said first control moment using said first actuator; and applying selectively said second control moment using said second actuators.

18. A method as recited in claim 16, further comprising the step of receiving desired pointing directions and rates before said computing of said control moment signal.

19. A method as recited in claim 16, wherein said computing includes the substeps of:

(i) computing a feedforward input signal; and (ii) computing a feedback input signal.

20. A method as recited in claim 19, wherein said feedforward input signal is computed as follows:

$$L_x = -(I_x - I_y + I_z)n\omega_z \sin \omega_z t$$

where:

$L_x$=a moment about said first of said axes $I_x$=a moment of inertia around said first of said axes $I_y$=a moment of inertia about said second of said axes $I_z$=a moment of inertia about a spin axis of said spacecraft, said spin axis being orthogonal to said first and second axes n=an angular rate such as one of an orbital angular rate and a slew angular rate $\omega_z$=an angular rate about said spin axis of said spacecraft t=time.

21. A method as recited in claim 20, wherein a second said feedforward input signal is computed as follows:

$$L_y = -(I_y - I_x + I_z)n\omega_z \cos \omega_z t$$

where:

$L_y$=a moment about said second of said axes.

22. A method as recited in claim 19, wherein said feedback input signal is computed as follows:

$$L_x = KI_x(n \cos \omega_z t - \omega_x)$$

where:

$L_x$=a moment about said first of said axes

K=an inverse of a nutation damping time constant n=an angular rate such as one of an orbital angular rate and a slew angular rate $\omega_z$=an angular rate about a spin axis of said spacecraft, said spin axis being orthogonal to said first and second axes t=time $\omega_x$=an angular rate about said first of said axes.

23. A method as recited in claim 22, wherein a second said feedback input signal is computed as follows:

$$L_y = KI_y(n \sin \omega_z t - \omega_y)$$

where:

$L_y$=a moment about said second of said axes $I_x$=a moment of inertia around said second of said axes $\omega_y$=an angular rate about said second of said axes.

24. A method for controlling the attitude state of a spinning spacecraft with a spinning momentum wheel, comprising the steps of:

pivoting said wheel independently about first and second orthogonal axes (x, y) by applying a first control moment to said spacecraft about said first axis (x) and a second control moment to said spacecraft about said second axis (y) to change said attitude state of said spacecraft;

sensing an attitude state of said spacecraft; and computing a control moment signal, said first control moment being applied to a first portion of a two-axis gimbal, said first portion pivoting about said first (x) of said axes, said second control moment being applied to a second portion of said gimbal, said second portion pivoting about said second (y) of said axes, said computing including the substeps of—

(i) computing a feedforward input signal, and (ii) computing a feedback input signal, said feedforward input signal being computed as follows:

$$L_x = (I_x - I_y + I_z)m\omega_z \sin \omega_z t$$

where:

$L_x$=a moment about said first of said axes $I_x$=a moment of inertia around said first of said axes $I_y$=a moment of inertia about said second of said axes $I_z$=a moment of inertia about a spin axis of said spacecraft, said spin axis being orthogonal to said first and second axes n=an angular rate such as one of an orbital angular rate and a slew angular rate $\omega_z$=an angular rate about said spin axis of said spacecraft t=time.

25. A method as recited in claim 24, wherein a second said feedforward input signal is computed as follows:

$$L_y = -(I_y - I_x + I_z)m\omega_z \cos \omega_z t$$

where:

$L_y$=a moment about said second of said axes.

26. A method for controlling the attitude state of a spinning spacecraft with a spinning momentum wheel, comprising the steps of:

pivoting said wheel independently about first and second orthogonal axes (x, y) by applying a first control moment to said spacecraft about said first axis (x) and a second control moment to said spacecraft about said second axis (y) to change said attitude state of said spacecraft;

sensing an attitude state of said spacecraft; and computing a control moment signal, said first control moment being applied to a first portion of a two-axis gimbal, said first portion pivoting about said first (x) of said axes, said second control moment being applied to a second portion of said gimbal, said second portion pivoting about said second (y) of said axes, said computing including the substeps of—

(i) computing a feedforward input signal, and (ii) computing a feedback input signal, said feedback input signal being computed as follows:

$$L_x = KI_x(n \cos \omega_z t - \omega_x)$$

where:

$L_x$=a moment about said first of said axes

K=an inverse of a nutation damping time constant n=an angular rate such as one of an orbital angular rate and a slew angular rate $\omega_z$=an angular rate about a spin axis of said spacecraft, said spin axis being orthogonal to said first and second axes t=time $\omega_z$=an angular rate about said first of said axes.

27. A method as recited in claim 26, wherein a second said feedback input signal is computed as follows:

$$L_y = KI_y(n \sin \omega_z t - \omega_y)$$

where:

$L_y$=a moment about said second of said axes $I_x$=a moment of inertia around said second of said axes $\omega_y$=an angular rate about said second of said axes.

* * * * *